United States Patent
Shah et al.

(10) Patent No.: US 9,529,594 B2
(45) Date of Patent: Dec. 27, 2016

(54) MISS BUFFER FOR A MULTI-THREADED PROCESSOR

(75) Inventors: Manish K. Shah, Austin, TX (US); Jama I. Barreh, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 1547 days.

(21) Appl. No.: 12/956,409

(22) Filed: Nov. 30, 2010

(65) Prior Publication Data

US 2012/0137077 A1    May 31, 2012

(51) Int. Cl.
*G06F 9/38* (2006.01)
*G06F 9/50* (2006.01)

(52) U.S. Cl.
CPC .......... *G06F 9/3802* (2013.01); *G06F 9/3814* (2013.01); *G06F 9/3851* (2013.01); *G06F 9/5027* (2013.01)

(58) Field of Classification Search
CPC ............................ G06F 9/3802; G06F 9/3851
USPC ....................................................... 712/225
See application file for complete search history.

(56) References Cited

U.S. PATENT DOCUMENTS

| | | | |
|---|---|---|---|
| 6,163,838 A * | 12/2000 | Merchant et al. | 712/219 |
| 6,275,924 B1 | 8/2001 | Subash et al. | |
| 7,185,178 B1 | 2/2007 | Barreh et al. | |
| 7,257,698 B2 | 8/2007 | Kawaguchi | |
| 7,383,403 B1 | 6/2008 | Barreh et al. | |
| 7,779,232 B2 | 8/2010 | Doing et al. | |
| 7,783,868 B2 | 8/2010 | Ukai | |
| 2001/0001153 A1 * | 5/2001 | Palanca et al. | 712/225 |
| 2003/0188139 A1 * | 10/2003 | Chrysos et al. | 712/225 |
| 2006/0026594 A1 * | 2/2006 | Yoshida et al. | 718/100 |
| 2008/0022045 A1 * | 1/2008 | Ali et al. | 711/125 |
| 2008/0195846 A1 | 8/2008 | Shen et al. | |
| 2010/0299499 A1 * | 11/2010 | Golla et al. | 712/206 |

* cited by examiner

*Primary Examiner* — Jacob A Petranek
(74) *Attorney, Agent, or Firm* — Meyertons, Hood, Kivlin, Kowert & Goetzel, P.C.

(57) ABSTRACT

A multi-threaded processor configured to allocate entries in a buffer for instruction cache misses is disclosed. Entries in the buffer may store thread state information for a corresponding instruction cache miss for one of a plurality of threads executable by the processor. The buffer may include dedicated entries and dynamically allocable entries, where the dedicated entries are reserved for a subset of the plurality of threads and the dynamically allocable entries are allocable to a group of two or more of the plurality of threads. In one embodiment, the dedicated entries are dedicated for use by a single thread and the dynamically allocable entries are allocable to any of the plurality of threads. The buffer may store two or more entries for a given thread at a given time. In some embodiments, the buffer may help ensure none of the plurality of threads experiences starvation with respect to instruction fetches.

18 Claims, 5 Drawing Sheets

MISS BUFFER FOR A MULTI-THREADED PROCESSOR

BACKGROUND

1. Technical Field

This disclosure relates to the execution of instructions in a multi-threaded computing environment, and, more specifically, to the use of instruction miss buffers in such an environment.

2. Description of the Related Art

When executing a computer program, a microprocessor may experience periods of delay in which no instructions are executed. For example, a program's execution may be delayed (stalled) when one or more program instructions are not present in an instruction cache. Although program execution may be resumed once the one or more instructions are fetched and become available, overall execution time may have been increased due to one or more periods of stalling that occurred.

In a microprocessor that implements chip level multithreading, multiple software threads are concurrently active, and execution of instructions may be interleaved among the active threads. Accordingly, in a multi-threaded processor, multiple threads may face the possibility of one or more program instructions not being present in an instruction cache, and the possibility of stalling.

SUMMARY

A multi-threaded processor may support "miss requests" to obtain one or more instructions for a given thread so that execution of the given thread may continue, and so that one or more periods of stalling may be reduced or eliminated. In one or more embodiments, processor resources may be used to store information for these miss requests during a time in which the miss requests are being serviced. Various schemes are disclosed to determine how these processor resources may be allocated amongst the different threads. One consideration that may be taken into account in these schemes is avoiding thread starvation, while another consideration is avoiding inefficiency (e.g., having processor resources go unnecessarily unused).

In one embodiment, respective portions of processor resources are dedicated for use by each of a respective subset of a plurality of threads, while other portions of processor resources are dynamically allocable to any thread in a group of two or more of threads. As one non-limiting example, consider a processor that supports eight total threads and that has thirty-two entries in a miss buffer. The miss buffer might have eight of those entries dedicated to respective ones of the eight threads, with the twenty-four remaining entries being allocable to any one of the threads. This distribution of processor resources may reduce the possibility of starvation associated with a miss request for a thread.

The teachings of the disclosure, as well as the appended claims, are expressly not limited by the features and embodiments discussed above in the Summary.

BRIEF DESCRIPTION OF THE DRAWINGS

The following detailed description makes reference to the accompanying drawings, which are now briefly described.

DETAILED DESCRIPTION

Figure 1:
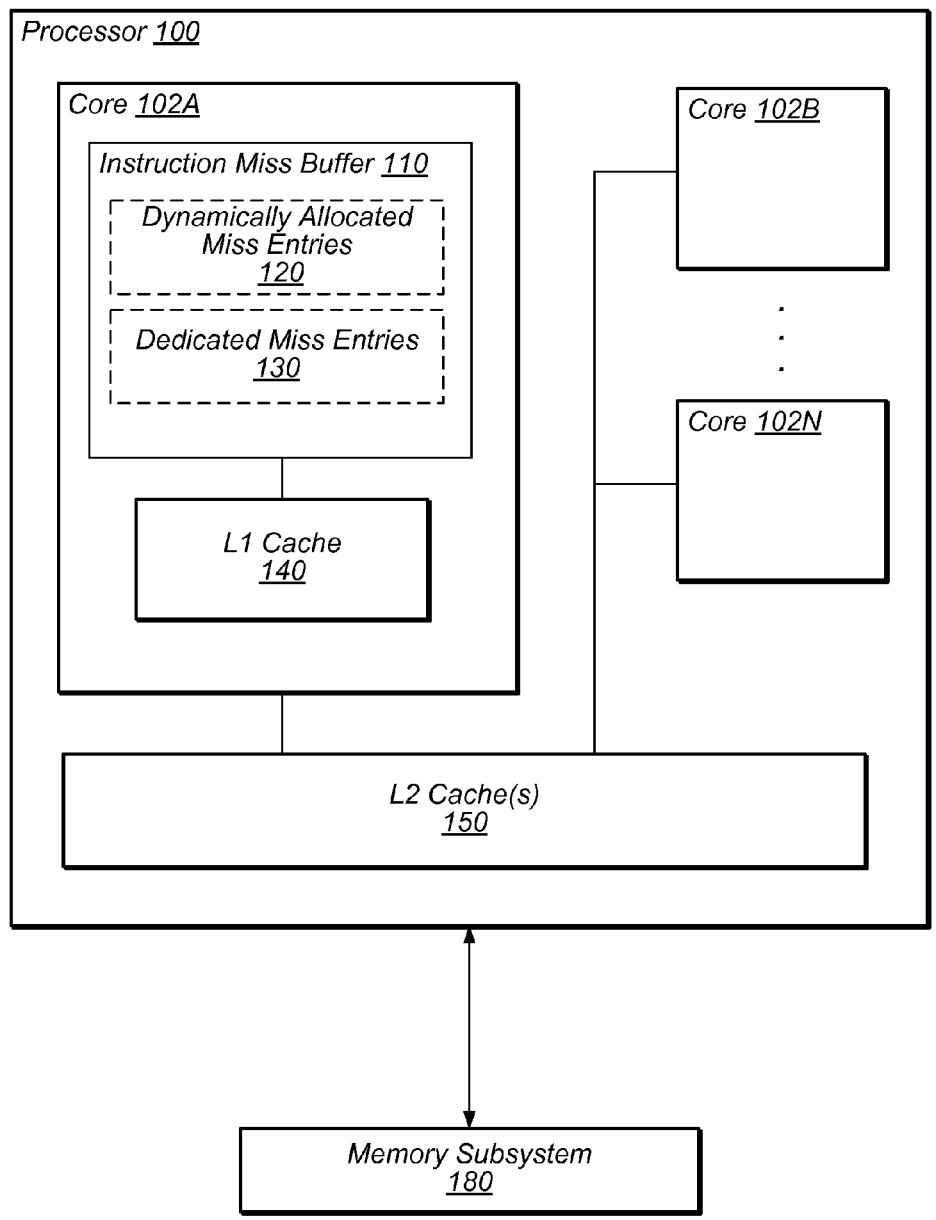
FIG. 1 is a block diagram illustrating one embodiment of a processor 100 having an instruction miss buffer with dynamically allocated miss entries and dedicated miss entries.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner in one or more embodiments. Further, the phrases "in one embodiment" or "in an embodiment" are not restrictive in the sense that these phrases should be interpreted to be equivalent to the phrase "in at least one embodiment" (rather than reading these phrases as restricting a feature to only a single embodiment, for example).

Terminology. The following paragraphs provide definitions and/or context for terms found in this disclosure (including the appended claims):

"Thread." This term has its ordinary and accepted meaning in the art, and includes a series of one or more instructions that may be stored on a computer readable medium and that are executable by a processor.

"Instruction Cache." This term has its ordinary and accepted meaning in the art, and includes a structure, in some embodiments, in which only program instructions are stored, as well as a structure, in other embodiments, in which both program instructions and program data are stored.

"Instruction Cache Miss." This term has its ordinary and accepted meaning in the art, and includes receiving a determination that requested instructions are not currently loaded in an instruction cache. The term also includes receiving information indicating that instructions are not currently stored in an instruction cache prior to a read request for those instructions being attempted.

"Set Of Thread State Information." As used herein, this term refers to one or more pieces of information associated with a given thread that are usable (with other information, in some embodiments) to start, re-start, and/or continue execution of instructions of that thread. In one embodiment, this information includes a program counter (PC) address for the thread. This information may include, in various embodiments, any or all of the information described with respect to exemplary miss buffer entry 200 (see FIG. 2).

"Concurrent," "Concurrently." As used herein, these terms refer to an overlap of at least one period of time. As just one example, consider a first miss buffer entry that is allocated at time=0 µs, and de-allocated (or freed) at time=150 µs, and a second miss buffer entry that is allocated at time=125 µs, and de-allocated at time=230 µs. In this example, the first and second miss buffer entries have been concurrently allocated. (A third miss buffer entry allocated at time=175 µs, and de-allocated any time thereafter, is allocated concurrent to the second miss buffer entry, but not the first miss buffer entry.) "Concurrent allocation," as used herein, thus refers to "overlapping allocation."

"Subset." As used herein, this term refers to a proper mathematical subset having at least one element, in which the subset is not equivalent to (i.e., is smaller than) a greater set to which that subset has a relationship. For example, as used herein, the sets {1, 2}, {1, 3}, and {2, 3} are all "subsets" of the set {1, 2, 3}, but, as used herein, the set {1, 2, 3} itself is not a "subset" of {1, 2, 3}.

"Comprising" or "Including." These terms are open-ended. As used in the appended claims, these terms do not foreclose additional structure or steps. Consider a claim that recites: "an instruction miss buffer comprising one or more miss entries . . . ." Such a claim does not foreclose the instruction miss buffer from including additional components or structures (e.g., interface units, additional circuitry, etc.). Additionally, where "two or more miss entries" are referred to as "each" including certain information, or having a certain property or configuration, this does not preclude the existence of other, differently configured miss entries that do not include the same certain information, or do not have the same certain property or same configuration.

"First," "Second," etc. As used herein, these terms are used as labels for nouns that they precede, and do not necessarily imply any type of ordering (e.g., spatial, temporal, logical, etc.). For example, in an instruction miss buffer having eight entries, the terms "first" and "second" can be used to refer to any two of the eight entries. In other words, the "first" and "second" entries are not limited to logical or hardware entries 0 and 1.

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. Further, "configured to" may include adapting a manufacturing process (e.g., a semiconductor fabrication facility) to fabricate devices (e.g., integrated circuits) that are adapted to implement or perform one or more tasks.

"Processor." This term has its ordinary and accepted meaning in the art, and includes a device that includes one or more instruction execution units. A processor may refer, without limitation, to a central processing unit (CPU), a co-processor, an arithmetic processing unit, a graphics processing unit, a digital signal processor (DSP), etc.

"Computer" or "Computer System." This term has its ordinary and accepted meaning in the art, and includes one or more computing devices operating together and any software or firmware stored thereon. A computing device includes one or more processors and a memory subsystem. A memory subsystem may store program instructions executable by the one or more processors to perform various tasks.

"Computer-readable Medium." As used herein, this term refers to a non-transitory, tangible medium that is readable by a computer or computer system, and includes magnetic, optical, and solid-state storage media such as hard drives, optical disks, DVDs, volatile or nonvolatile RAM devices, holographic storage, programmable memory, etc. The term "non-transitory" as applied to computer readable media herein is only intended to exclude from claim scope any subject matter that is deemed to be ineligible under 35 U.S.C. §101, such as transitory (intangible) media (e.g., carrier waves), and is not intended to exclude any subject matter otherwise considered to be statutory.

In a multi-threaded processor that supports miss requests, various schemes may be used to determine what processor resources may be used by different threads. In a first possible scheme, each of a plurality of threads is statically allocated an equal (unchanging) portion of the processor's resources for the purpose of storing miss request information. For example, in a processor that supports eight threads and has thirty-two portions of processor resources (e.g., thirty-two miss buffer entries) available for miss requests, each of the eight threads might have four portions of processor resources statically allocated to it. Such a scheme may result in inefficiencies, however, because when a thread generates only a small number of miss requests (or does not generate any miss requests at all), the processor resources that are statically allocated to that thread may be underutilized. Thus in the example above, although four portions of resources (e.g., miss buffers) are statically allocated to each thread, a given thread may not be using all of its allocated resources at any given time. Further, while one or more threads may not be using all their available resources, another thread might be using its full allocation of processor resources, and thus be unable to make additional miss requests (even though numerous portions of processor resources for other threads might not be in use). Thus, in another embodiment, each one of a plurality of threads has a respective miss entry dedicated for use by that thread, while other miss entries are dynamically allocable to any of the threads. In this embodiment, thread starvation is avoided because each thread has dedicated processor resources sufficient for at least one miss request, but the other (non-dedicated) portions of processor resources may also be used more efficiently, as they can be dynamically allocated to any of the threads as needed.

Turning now to FIG. 1, a block diagram is shown illustrating one embodiment of a processor 100 having an instruction miss buffer 110 with dynamically allocated miss entries 120 and dedicated miss entries 130. Processor 100 includes L1 cache 140, which is an instruction cache in the embodiment shown. In some embodiments, L1 cache 140 is configured to store program data in addition to program instructions. L2 cache 150, in the embodiment shown, is likewise an instruction cache (but may also store program data in some embodiments). L1 cache 140 is shown as being located on-board a processor core 102A, while L2 cache 150 is shown as being located off-board from the processor core 102A. In various embodiments, however, L1 and L2 caches (as well as other memory hierarchy structures) may be located either on-board or off-board from a processor core and/or a processor. As shown, L2 cache 150 comprises one or more L2 caches, which may also interact with one or more other processor cores 102. Processor cores 102B-102N may be configured in the same manner as core 102A, but may also be configured differently in various embodiments. Processor 100 is configured to interact with a memory subsystem 180 (described further below).

Processor 100 is configured to execute instructions for a plurality of threads, and may include any number of processor cores 102, execution units, and other hardware structures to execute instructions for the plurality of threads. As just one example of some of the structures and techniques that may be used in processor 100, see U.S. patent application Ser. No. 12/652,641 and/or U.S. patent application Ser. No. 12/494,532, both of which are herein incorporated by reference in their entirety. In one embodiment, eight threads are supported by processor 100, but a greater or fewer number threads are supported in other embodiments. Cores 102, in one embodiment, include one or more execution units (and/or associated structures) that are configured to execute instructions for any one of a plurality of threads supported by processor 100. In other embodiments, a core 102 may support execution for only a subset of the plurality of threads. Accordingly, processor 100 may implement chip level multi-threading (CMT) in some embodiments, and thereby improve execution performance.

Memory subsystem 180 may store instructions executable by processor 100, and includes at least one computer readable medium. Thus, in various embodiments, memory subsystem 180 may include any number of storage devices (e.g., magnetic or optical media-based storage devices including hard drives, tape drives, CD drives, DVD drives, etc.), RAM modules, etc. In one embodiment, processor 100 fetches instructions from memory subsystem 180 prior to executing those instructions, and stores these fetched instructions in L1 cache 140, L2 cache 150, and/or other cache or memory structures.

In at least one embodiment, L1 cache 140 (or another suitable structure within processor 100) provides instructions to one or more execution units within processor core 102. Providing instructions to one or more execution units may include placing those instructions into an execution pipeline in some embodiments (for example, in one embodiment, placing instructions into an execution pipeline includes an instruction fetch unit passing instructions to a select unit. See, e.g., the '641 application.) Execution of that thread progresses as more instructions are delivered to (and executed by) the one or more execution units within a core 102. In some embodiments, L1 cache 140 is a higher speed cache configured to store instructions (e.g., an I-Cache), while L2 cache 150 is a larger, slower cache in these embodiments.

Processor 100 may execute instructions speculatively in some embodiments. For example, an instruction may be executed (and have results calculated) without knowing whether or not those results will actually become permanently committed to an architectural state of the processor. Depending on whether or not program flow follows the path that includes the speculatively executed instructions, the results of speculatively executed instructions may be discarded (or they may become permanently committed to an architectural state).

One or more instructions to be executed for a given thread (either speculatively or non-speculatively), may not be physically present in L1 cache 140 at a given time. Conditions that might cause instructions not to be present, for example, include a lack of sufficient free space in L1 cache 140, or mispredicting the execution path for a thread (such as picking the wrong side of a branch), though other conditions may cause instructions not to be present at a given time. A thread that has no further instructions in L1 cache 140 that are to be executed, in some embodiments, will be forced to stall until additional instructions for that thread arrive in L1. Thus, in some embodiments, an instruction cache miss occurs when one or more instructions are sought for execution (either speculative or non-speculative), but are not present in L1 cache 140.

As a result of an instruction cache miss in various embodiments, a miss request corresponding to one or more instructions may be generated. The generation of a miss request may be performed by an instruction fetch unit, an instruction select unit, or one or more other structures associated with core 102 or processor 100. In some embodiments, a miss request is not generated for each and every instruction cache miss, and in these embodiments, information associated with the cache miss may determine whether or not a miss request is actually generated for a particular cache miss.

In one embodiment, a miss request corresponds to one cache line of instructions in L1 cache 140. For example, in this embodiment, L1 cache 140 may be comprised of a plurality of cache lines, each having the ability to store 16 instructions, and thus a miss request would correspond to a block of 16 instructions in this embodiment. A miss request need not be limited to corresponding to a single cache line in L1 cache 140, however, and the number of instructions to which a miss request corresponds may vary by embodiment and as would occur to those of skill in the art. In one embodiment, miss requests may have different formats, and different miss requests may respectively correspond to different numbers of instructions.

A miss request for one or more instructions not present in L1 cache 140 may be handled or serviced, in some embodiments, by referring that miss request out to other elements of a computer system's cache/memory hierarchy. In one embodiment, if one or more instructions targeted by a miss request are present within L2 cache 150, circuit logic ensures that the requested instructions are forwarded by L2 cache 150 to L1 cache 140 in order to fulfill the miss request. If the one or more instructions are not present in L2 cache 150 in this embodiment, however, the miss request may be forwarded to an L3 cache and/or to other cache or memory structures. Thus in one embodiment, a miss request that misses L2 cache 150 may be sent to an L3 cache, and if the miss request also misses the L3 cache, the request may be forwarded to memory subsystem 180. In one embodiment, each level of a cache/memory hierarchy includes logic to handle miss requests, and circuitry within (or associated with) cache/memory structures such as 140, 150, and 180 may reformat or process a miss request as the miss request is sent further into the memory hierarchy. Further detail about miss requests and miss entries is provided below with respect to FIG. 2. Thus, miss requests in at least one embodiment are sent from core 102A to L2 cache 150 and possibly on to other memory structures capable of storing program instructions (e.g., to L3 cache or memory subsystem 180). In one embodiment where a miss request corresponds to one cache line of 140, at least one cache line of instructions to be stored in L1 cache 140 will be fetched in association with servicing the miss request.)

Miss entries may be used to manage, track, and/or store information corresponding to miss requests in various embodiments. In one embodiment, a plurality of miss entries, each corresponding to an instruction cache miss, are included in instruction miss buffer 110. In this embodiment, processor 100 is configured to execute instructions for a plurality of threads, and miss buffer 110 is configured to store, for a given one of a plurality of threads, two or more sets of thread state information in two or more of the plurality of entries at a given time. Further, in this embodiment, the two or more miss entries correspond to two or more instruction cache misses for the given thread. Thus, as just one example, a first instruction cache miss may occur for thread 3, and a corresponding first set of thread state information may be stored in a first entry; before that first miss request has been fully resolved or handled, a second instruction cache miss for thread 3 may result in a corresponding second set of thread state information being stored in a second miss entry. In this example, these first and second miss entries are thus used concurrently (i.e., stored at a given time together). In one embodiment, one or more miss entries in instruction buffer 110 may each be configured to store a set of thread state information that corresponds to a given one of the plurality of threads to an instruction cache miss for that given thread. Additionally, each of a plurality of miss entries may be configured to store thread state information corresponding to a respective instruction cache miss (i.e., a first miss entry may store a first set of thread state information corresponding to a first instruction cache miss, while a second miss entry may store a different, second set of thread state information corresponding to a different, second instruction cache miss, though both first and second cache misses may correspond to the same thread.)

Instruction miss buffer 110 is configured, as shown in the embodiment of FIG. 1, to include pluralities of miss entries 120 and 130. In this embodiment, a portion of entries 120 includes one or more dynamically allocable entries (also referred to as "public group" entries), each of which is allocable to a given one of a group of two or more of a plurality of threads. Put in another way, in this embodiment, each one of entries 120 may be allocated to a first thread, and then later allocated to a second thread. In various further embodiments, each of entries 120 can be allocated at a given time to any number of threads, up to and including all threads supported by processor 100. Entries 120 are not thus limited, however, and may include differently configured entries within the same embodiment, and/or be configured to store additional information in some embodiments. (Miss buffer entries are discussed further below with respect to FIG. 2.)

As shown in FIG. 1, a portion of entries 130 includes one or more dedicated entries (also referred to as "private group" entries), each of which is reserved for the use of a respective subset of a plurality of threads supported by processor 100. Put in another way, in the embodiment of FIG. 1, for each entry 130, at least one thread of the plurality of threads cannot be allocated to that entry. In a further embodiment, each of entries 130 is reserved for the use of only one of the plurality of threads (thus, a first entry may be reserved for thread 0, a second entry may be reserved for thread 1, etc.) Entries 130 are not thus limited, however, and may be variously configured such that different entries 130 have different configurations (including within the same embodiment) and may be configured such that different entries are reserved for the use of different numbers of threads. Entries 130 may be configured to store additional information in some embodiments.

Once a miss request is serviced (or "handled"), a corresponding miss buffer entry may be freed (i.e., deallocated from use by a particular thread). Once a miss buffer entry is freed, it may then be used again for another miss request. In some embodiments, handling a miss request includes one or more instructions being copied into L1 cache 140. Handling a miss request involves coordination between L1, L2, and/or L3 caches, as well as memory subsystem 180 in various embodiments, which may include signaling and/or invalidation communications as would occur to those of skill in the art. When a miss buffer entry is freed, multiple threads may be waiting to use that miss buffer entry (i.e., two or more threads may each have a miss request). In one embodiment, the processor is configured to maintain information usable to determine which one of the two or more threads should get the freed miss buffer entry (for example, when all other entries are in use). An arbitration scheme could be used in which a pointer indicates the last thread to have gotten a miss buffer entry, and a next highest numbered thread having a miss request could be awarded the recently freed entry (for example, if thread 1 got the last entry, and threads 0, 1, and 6, all have miss requests, thread 6 would get the entry; the pointer could also wrap-around as needed (e.g., thread 0 would be treated as the next "higher" thread from thread N−1). In another arbitration scheme, the lowest numbered thread could always be given priority. In yet another arbitration scheme, a thread with a fewest number of currently outstanding miss requests could be awarded the recently freed entry (e.g., if threads 0, 1, and 6 all have miss requests, and threads 0 and 1 each have two miss requests being serviced while thread 6 only has one miss request being serviced, thread 6 would be awarded the free entry). These schemes may be variously combined in different embodiments.

Figure 2:
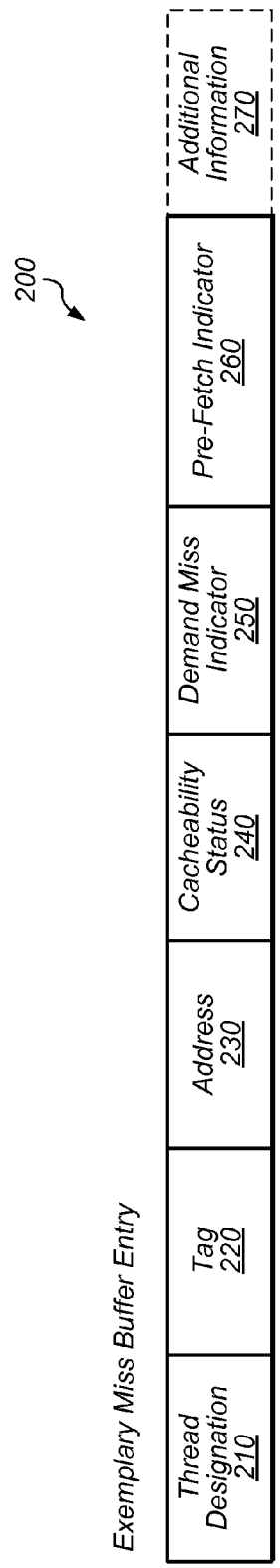
FIG. 2 is a block diagram illustrating one embodiment of an exemplary miss buffer entry and the information that may be stored therein.

Turning now to FIG. 2, one embodiment 200 of a miss buffer entry is shown. This entry 200 includes information that may be stored within one of entries 120 or 130 in association with a miss request. A set of thread state information may include all of or any portion of miss entry 200 (and may also include additional information in various embodiments). In one embodiment, all or any portion of information in a miss buffer entry such as 200 may be stored in a finite state machine for a thread (e.g., a state machine that maintains one or more execution states for the thread and that may include other information such as last instruction committed to an architectural state, etc.) Information in entry 200 includes thread designation 210, tag information 220, address information 230, cacheability status 240, critical (demand) miss indicator 250, pre-fetch (speculative) indicator 260, and/or additional information 270. In various embodiments, not all information shown in entry 200 will exist for a given miss entry. In some embodiments, individual entries in structures 120 and/or 130 may each include different information, and thus entries 120 and 130 may not be identical in content structure. In various embodiments, miss buffer entries 120 and 130 may be stored within the same physical structure, while in other embodiments entries 120 and 130 may be stored in two or more different physical structures. Instruction miss buffer 110 may include additional structures and/or information in addition to entries 120 and 130. Information in miss buffer entry 200 may be combined amongst itself (as well as with other information) as would be apparent to one of skill in the art, and need not be maintained in distinct, separate entries (e.g., separate bit fields) in some embodiments.

Thread designation information 210 includes information indicating which one of a plurality of threads is making use of (storing information in) a particular miss entry. Thread designation information 210, in some embodiments, includes a thread ID. In one embodiment in which processor 100 supports eight threads, this thread ID could simply be a three bit value indicating a thread value between 0 and 7, for example. As with all types of information included in miss entry 200, thread designation information 210 may (or may not) be present in miss entries in various embodiments.

Tag information 220 is discussed herein. In some embodiments, instruction cache misses and/or corresponding miss requests may be serviced in an out-of-order fashion (i.e., the order in which miss requests are generated may not be the order in which those miss requests are handled). In one embodiment, tag information 220 is used to identify and/or track different miss requests to facilitate handling out-of-order completion for those miss requests. Tag information 220, in some embodiments, may accompany a miss request through the cache/memory hierarchy, and be returned to instruction miss buffer 110 when the miss request has been serviced (and thus, in one embodiment, the tag information of a miss request that has been serviced is matched up with the tag information of a corresponding miss entry to determine which miss entry to free, where instructions should be stored in instruction buffer 110, etc.) Tag information 220 may, in various embodiments, be represented using a relatively small number of bits (e.g., a number of bits fewer than address information 230 (discussed below)). As discussed above, tag information 220 may be passed through various memory stages of processor 100 (and/or memory subsystem 180 or other structures), and using an entire memory address (e.g., a 64 bit wide address) instead of tag information might require additional hardware in some embodiments. However, address 230 (or some portion thereof) may function as tag information 220 in some embodiments. In one embodiment, there are a total number N of miss entry buffers (e.g. 32 may be the total number of entries in 120 and 130), and tag information 220 is simply an identifying number between 0 and N−1 (e.g., 0 to 31). Results from a miss request that arrive at instruction miss buffer 110 may be matched to a corresponding miss buffer entry by examining the tag information attached to the results and comparing it to tag information stored in entries 120 and 130.

Address information 230 is used to store information associated with an execution point in the thread—for example, in some embodiments, the address of an instruction for which a miss occurred in the L1 cache is stored. In other embodiments, address information 230 may store information such as a base address of an L1 cache line of instructions that is being retrieved. Address information 230 may be identify, in one embodiment, the address that caused an instruction cache miss to occur and for an instruction miss request to be generated. Thus, address information 230 may contain a next address to be executed for a particular thread in some embodiments.

Demand miss indicator information 250 is used to indicate whether a miss request is considered to be a demand (or "critical") miss. Pre-fetch indicator information 260, meanwhile, is used to indicate whether a miss request is a pre-fetch (or "speculative") miss. A demand miss request may occur when thread instructions needed for execution are not stored in L1 cache 140. Thus, a demand miss request may indicate that instructions which are non-speculative need to be fetched, and in some embodiments, a demand miss request may need to be serviced to prevent stalling of the thread. A speculative miss request may occur when an instruction cache miss occurs on one or more thread instructions for which it is uncertain whether the results of execution will be needed. Thus, the results of instructions associated with a speculative miss request might or might not actually end up being committed by the thread. For example, consider a first branch-jump instruction BR1. In one embodiment, a prediction unit predicts a first branch will be taken, and a speculative miss request is issued for instructions in the execution path of the first branch. However, when instruction BR1 is actually evaluated and its results become available, it may turn out that the prediction was incorrect, and that a different execution path should have been followed instead. In this example, results of the instructions associated with the speculative miss request will be discarded, and a demand miss request might be issued for one or more instructions in the different execution path (the incorrectly predicated other path of the BR1 instruction) if those instructions are not stored in L1 cache 140. Demand miss indicator 250 and pre-fetch information 260 may be combined in some embodiments. Different structures in the cache/memory hierarchy may also treat miss requests for demand misses and pre-fetch misses differently in some embodiments (for example, if both a pre-fetch miss request and a demand miss request are being made, the demand miss request may be given priority). In one embodiment, only one demand miss request is serviced for a given thread at a given time (e.g., only one miss entry stores a set of thread state information for a demand miss for the given thread), but any number of speculative miss requests for the given thread may be serviced at a given time (e.g., multiple miss entries may store sets of thread state information corresponding to speculative instruction cache misses).

Cacheability status information 240 is used to indicate whether a miss request is cacheable or non-cacheable. A cacheable miss request, as a result of being handled, may cause L1, L2, and/or other memory/cache structures (e.g., L3 cache), to retain a copy of one or more instructions associated with the miss request. A non-cacheable miss request, on the other hand, will result in the exclusion of one or more instructions associated with that miss request from being retained in at least one of L1, L2, or another memory/cache structure. Thus, in various embodiments, cacheability status information 240 may indicate whether and how a miss request should be cached at each level of the cache/memory hierarchy. The decision to indicate a miss request as cacheable or non-cacheable may be made by a programmer or a compiler in some embodiments. Thus, in some embodiments, one or more program instructions may trigger a miss-request, and may also indicate that the miss request should not be cached.

Additional information 270 may also be stored within a miss buffer entry. In some embodiments, this includes cache replacement information (e.g., information to indicate the relative age of an entry to determine whether it should be replaced (LRU information), etc.). A miss buffer entry is thus not limited to what is shown in FIG. 2, and in various embodiments, a miss buffer entry may have any combination of one or more of the types of information shown. Further, in some embodiments, different configurations may exist for miss buffer entries in the same instruction buffer 110 and/or structures 120 or 130. Thus in one embodiment, dynamically allocated entries 120 include different information than dedicated entries 130; in another embodiment, a first entry amongst 120 may include different information than a second entry amongst 120 (and likewise with entries 130).

Figure 3:
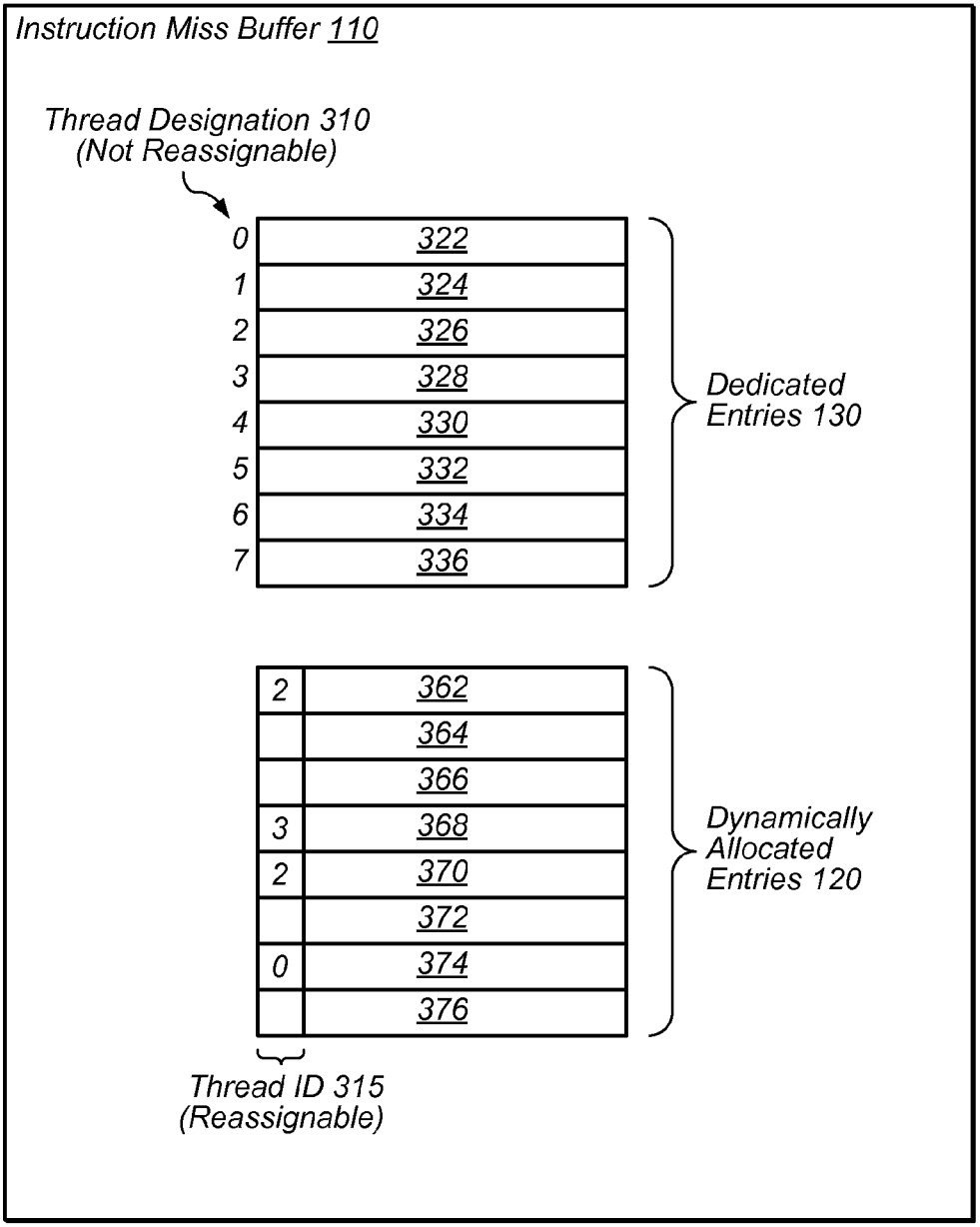
FIG. 3 is a block diagram illustrating one embodiment of an instruction miss buffer for use in association with a processor supporting eight threads.

Turning now to FIG. 3, one embodiment of an instruction miss buffer 110 is shown. In this embodiment, eight threads are supported by processor 100. Each of dedicated entries 130 is reserved for the use of a particular one of the eight threads in this embodiment, while dynamic entries 120 are assignable to any of the plurality of threads in this embodiment. As shown, each one of entries 322-336 represents one miss buffer entry. Entry 322 is dedicated solely to the use of thread 0, while entry 324 is dedicated solely to the use of thread 1, and so forth. The dedication of an entry 130 to a particular thread in the embodiment of FIG. 3 is indicated by thread designation information 310. In the embodiment of FIG. 3, thread designation information 310 is an index into dedicated miss entries 322-336. (Thus, the 0th index into entries 130 corresponds to a miss buffer entry [322] solely dedicated to thread 0, while the 7th index into entries 130 [entry 336] corresponds to a miss buffer entry [336] solely dedicated to thread 7.) In the embodiment of FIG. 3, thread designation information 310 thus need not be explicitly stored within miss entries 322-336 (e.g., stored as a separate series of bits), and the designation of an entry may be implicit from the physical location for or index into that entry. In the embodiment of FIG. 3, miss buffer entries 322-336 may have any of the information and/or qualities described above with respect miss buffer entries (i.e., entry 200 as discussed relative to FIG. 2).

Dynamically allocated entries 120 may be allocated to any one of threads 0-7 in the embodiment of FIG. 3. A thread ID indicator 315 may be used to indicate the thread to which a given entry is (currently) allocated. Thus, as shown, entries 362 and 370 are allocated to thread 2, entry 368 is allocated to thread 3, and entry 374 is allocated to thread 0. In the embodiment of FIG. 3, entries amongst 362-376 are allocated on a first-come, first-serve basis (i.e., entries are allocated in an order corresponding to the order in which those threads create miss requests). Thread ID 315 is reassignable in this embodiment, and once an entry 120 is freed from use by a first thread, another thread may make use of that entry.

Free miss entries amongst entries 120 and/or 130 may be allocated or assigned, in one embodiment, using one or more bit masks. In this embodiment, finding a free entry is performed using a bit mask that is as wide as a number of miss entries. In an embodiment with eight miss entries, a bit mask may start out as all zeros (e.g., 00000000). When a miss is encountered, a zero in this mask is searched for, and a bit in the mask is then changed to 1 to indicate it is busy. The bit mask can then be changed back to zero when the entry is free in this embodiment. Thus, a bit mask of 10010110 indicates, in this example, that four out of eight entries in use, and that four are free (the locations of the 1s and 0s further indicate which particular entries are free and which are not). Once all dynamically allocated entries 120 are in use in various embodiments, a thread must wait until an entry is freed (or de-allocated) in order to use a miss buffer entry 120. Thus, once one of entries 120 is no longer needed to hold miss request information (e.g., after a miss request is serviced), that entry can be freed and reassigned.

In the embodiment of FIG. 3, thread starvation may be avoided as a result of the miss entry dedication scheme used with respect to miss buffer entries 130. Because each one of the eight threads supported by processor 100 has at least one miss buffer entry reserved for its use alone, any given thread in the embodiment of FIG. 3 will always be able to use at least one miss buffer entry. Whether more than one miss buffer entry can be used by any given thread in this embodiment depends, however, on whether any entries are free at the time a second, request for a miss buffer entry is made—for example, if the dedicated entry 130 for a given thread is already in use by that thread, whether a second entry can be allocated to that thread may depend on whether an entry is available amongst entries 120. In contrast, in an another embodiment with only dynamically allocated entries 120 and no dedicated entries 130, a first thread could potentially monopolize every single available miss buffer entry, and another given thread would not be guaranteed at least one available miss buffer entry (which could ultimately lead to starvation—for example, upon one of the dynamically allocated entries becoming free, there might be no guarantee that a second thread would be able to succeed in acquiring a newly freed entry, as other threads might "steal" the newly freed miss entry before the second thread was able to use it). In this fashion, thread starvation might occur for the second thread, as the second thread might have to sit idle without fresh instructions to be provided to one or more execution units of processor 100 (that is, unless some kind of mechanism or mediation scheme was put in place). Therefore at least one way in which thread starvation can be avoided or mitigated is to allow each thread to have a dedicated miss buffer entry 130, because in such a scenario a thread may (at worst) only have to wait for its own earlier miss request to be serviced, and that thread could not be "locked out" as in the embodiment discussed above. Thus, even when a dedicated entry 130 for a particular thread is in use, that entry should eventually become free as the corresponding miss request is serviced, at which time a new miss request entry can be made for the particular thread.

Other miss buffer entry schemes to avoid or mitigate thread starvation are also possible. For example, in embodiments other than that of FIG. 3, a portion of the entries in miss buffer 110 might be "semi-reserved" entries. For example, in one embodiment, processor 100 supports eight threads but only includes four "semi-reserved" (dedicated) entries 130. In this particular embodiment, a first dedicated entry in this embodiment might be usable by either one of thread 0 and thread 1, while a second dedicated entry might be usable by either one of thread 2 and thread 3, and so on. In such an embodiment, dynamically allocated entries 120 could still be used on a first-come, first-serve basis, but the four "semi-reserved" entries, each of which is potentially usable by two threads, could be alternated between those threads. Thus in this embodiment, if a first semi-reserved miss buffer entry was in use by thread 0, once that first miss buffer entry was freed, thread 1 would be given the first opportunity to use that entry (which avoids the possibility that thread 0 could indefinitely monopolize the first dedicated miss buffer entry, while thread 1 starved.) In this approach, thread 1 might thus be awarded the next opportunity to use the entry dedicated to threads 0 and 1, and the next opportunity after would be awarded to thread 0. Similarly, in another embodiment, a round robin approach could be used in if dedicated entries were reserved for the use of any one of three or more threads. For example, in this embodiment, thread 0 might get the first chance to use the dedicated miss buffer entry, thread 1 would get the second chance, thread 2 would get the third chance, and then priority could be alternated back to thread 0, giving thread 0 the fourth chance to re-use that miss buffer entry. In this embodiment where a dedicated entry may be reserved for the use of three or more threads, a thread not needing priority for the entry could be skipped (thus continuing the above example, if thread 0 did not need to make an entry at a time that it had priority on the dedicated entry, thread 1 and then thread 2 could be given the chance to use the entry). Thus, in some embodiments, there may be a fewer number of dedicated entries 130 than a number of threads supported by processor 100. (In other embodiments, a number of dedicated entries 130 is equal to or greater than a number of threads supported by processor 100, and one or more threads might have more than one dedicated entry.)

In yet further embodiments, starvation could be mitigated or avoided by having one or more dynamically allocated entries 120 flexibly switched to a "dedicated use mode" depending on the number of threads currently active in processor 100 (and/or processor core 102A). For example, in one embodiment, two entries 130 might be permanently (non-reassignbly) dedicated to use by threads 0 and 1. All other miss buffer entries might be dynamically allocable (and thus might be allocated to any given one of the threads in one embodiment.) However, upon a third thread (e.g., thread 2) becoming active, one of those dynamically allocable miss buffer entries might be "converted" into a dedicated entry for as long as thread 2 is active (thus putting that entry into a dedicated use mode). Such a scheme could be implemented by additional control structures and/or mediation schemes as would occur to one of skill in the art in view of this disclosure—for example, in the event that thread 2 became active when all miss buffer entries were in use by threads 0 and 1, digital logic could be provided to ensure that thread 2 would eventually be allocated a "dedicated use mode" miss buffer entry. (This could be done by setting a flag, for example, and checking that flag upon freeing or de-allocating one of the dynamically allocable entries in these embodiments; thus if a flag was set for thread 2, a dynamically allocable entry becoming available would cause that entry to be switched into a dedicated use mode.) Upon thread 2 becoming inactive, or after a certain period of clock cycles had occurred, that entry could be switched out of dedicated use mode and back into non-dedicated (dynamically allocable) mode.

Figure 4:
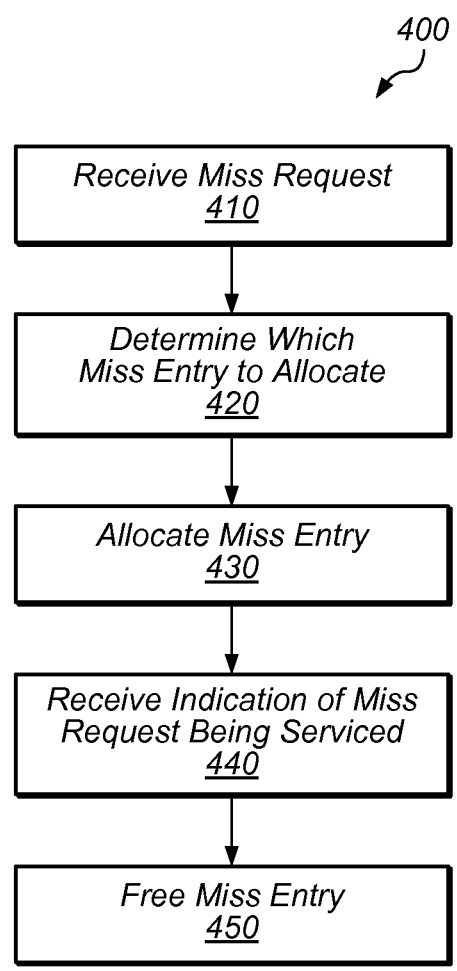
FIG. 4 is a flowchart illustrating an example of a method for handling a miss request.

Turning now to FIG. 4, a flowchart illustrating an example of a method 400 for handling a miss request is shown. In various embodiments, steps of method 400 may be performed, wholly or in part, by instruction miss buffer 110, any one of cores 102, and/or other logic and/or structures within processor 100. In step 410, a miss request corresponding to an instruction cache miss for a given thread is received. In response to receiving the miss request, step 420 determines which miss entry to allocate. For example, in one embodiment, step 420 comprises checking a dedicated entry 130 corresponding to the particular thread to determine if that dedicated entry is in use, and if not, allocating that entry to the received miss request in step 430. Step 420 also includes, in one embodiment, checking to see if a dynamically allocable entry 130 is free to be allocated, and if so, allocating that entry to the miss request in step 430. Thus in one embodiment, a check is performed on dedicated entries before performing a check on dynamically allocable entries, but in other embodiments this check could be performed in an opposite order and/or simultaneously. As discussed above, step 430 includes allocating a particular miss entry for the received miss request corresponding to the given thread. In one embodiment, step 430 comprises storing a set of thread state information in a miss buffer entry 120 or 130. Any of the steps of method 400 may be performed in any order for two or more miss requests of a given thread. For example, method 400 thus includes, in one embodiment, storing a first set of thread state information for the given thread in a first one of a plurality of miss entries in step 430, and then prior to a first miss request corresponding to the first instruction cache miss being serviced, the processor storing a second set of thread state information for the given thread in a second one of a plurality of miss entries. (In this embodiment, the first set of thread state information corresponds to a first instruction cache miss for the given thread and the second set of thread state information corresponds to a second instruction cache miss for the given thread.) Step 430 also includes, in one embodiment, allocating a dynamically allocable miss entry of an instruction miss buffer to the given thread, when a dedicated miss entry of the instruction miss buffer reserved for the use of the given thread has already been allocated. (Note: as used in this disclosure, the term "allocating a miss entry" includes, in one embodiment, storing a set of thread state information in that miss entry.)

In step 440, an indication is received that the particular miss request has been serviced. Servicing a miss request may include one or more requested program instructions being fetched from L2 cache 150 (and/or being fetched from other structures in the cache/memory hierarchy, such as L3 cache or memory subsystem 180), and copied to L1 cache 140 (or another structure accessible to a core 102). In some embodiments, a second miss request made subsequent to a first miss request may be serviced prior to the first miss request (i.e., miss requests may be serviced out of order.) In step 450, the miss entry allocated in step 430 is freed (or de-allocated). This step includes, in one embodiment, turning off a "valid bit" (in a bit mask, for example) to indicate that the entry is free. In other embodiments, de-allocation may be accomplished in different fashions (for example, one or more types of information that are stored in a miss buffer entry could be set to predetermined flag values, such as setting tag information 220 to a value of −1, etc.). Thus in one embodiment, method 400 includes freeing a (previously allocated) miss entry in response to a miss request being serviced.

Exemplary System Embodiment

An exemplary system embodiment is described below.

Figure 5:
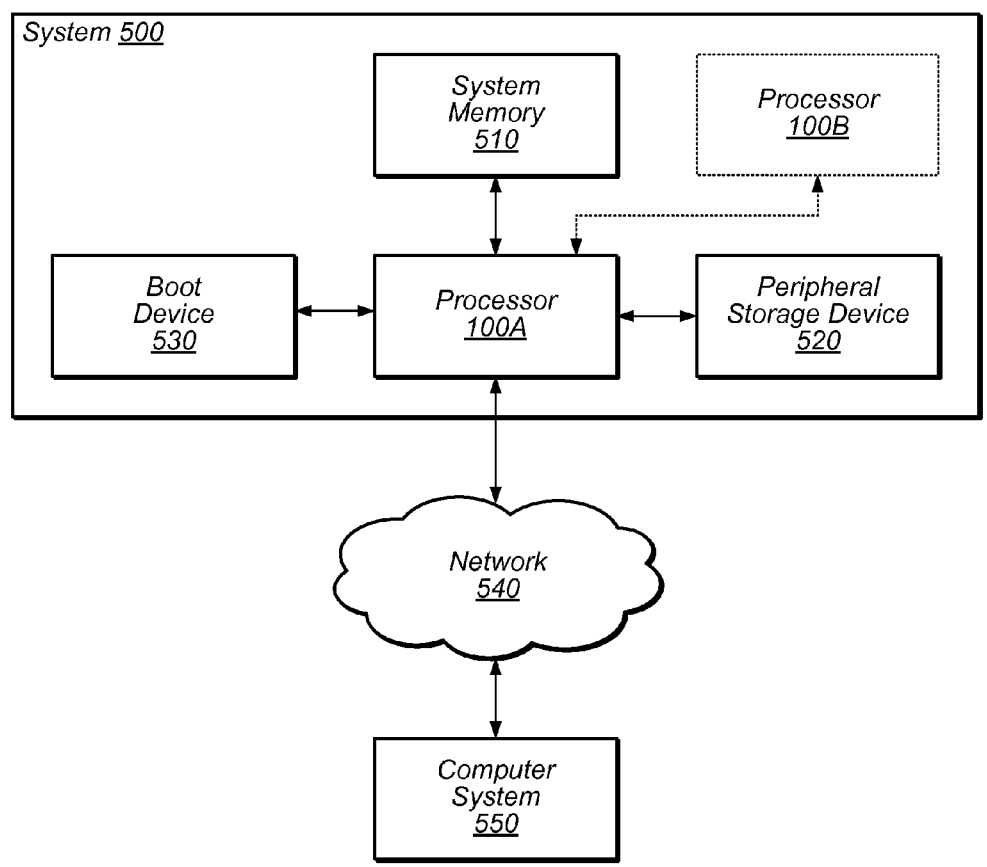
FIG. 5 is a block diagram illustrating one embodiment of a system including processor 100.

In some embodiments, processor 100 of FIG. 1 may be configured to interface with a number of external devices. In FIG. 5, one embodiment of a system including processor 100 is illustrated. 5. In the illustrated embodiment, system 500 includes an instance of processor 100, shown as processor 100A, which is coupled to a system memory 510, a peripheral storage device 520 and a boot device 530. System 500 is coupled to a network 540, which is in turn coupled to another computer system 550. In some embodiments, system 500 may include more than one instance of the devices shown. In various embodiments, system 500 may be configured as a rack-mountable server system, a standalone system, or in any other suitable form factor. In some embodiments, system 500 may be configured as a client system rather than a server system.

In some embodiments, system 500 may be configured as a multiprocessor system, in which processor 100A may optionally be coupled to one or more other instances of processor 100, shown in FIG. 5 as processor 100B. For example, processors 100A-B may be coupled to communicate via respective coherent processor interfaces.

In various embodiments, system memory 510 may comprise any suitable type of system memory as described above, such as FB-DIMM, DDR/DDR2/DDR3/DDR4 SDRAM, or RDRAM®, for example. System memory 510 may include multiple discrete banks of memory controlled by discrete memory interfaces in embodiments of processor 100 that provide multiple memory interfaces. Also, in some embodiments, system memory 510 may include multiple different types of memory. A portion or the entirety Memory subsystem 180 may comprise system memory 510 in one embodiment.

Peripheral storage device 520, in various embodiments, may include support for magnetic, holographic, optical, or solid-state storage media such as hard drives, optical disks, nonvolatile RAM devices, etc. In some embodiments, peripheral storage device 520 may include more complex storage devices such as disk arrays or storage area networks (SANs), which may be coupled to processor 100 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 100, such as multimedia devices, graphics/display devices, standard input/output devices, etc. In one embodiment, peripheral storage device 520 may be coupled to processor 10 via peripheral interface(s).

In one embodiment a boot device 530 may include a device such as an FPGA or ASIC configured to coordinate initialization and boot of processor 100, such as from a power-on reset state. Additionally, in some embodiments boot device 530 may include a secondary computer system configured to allow access to administrative functions such as debug or test modes of processor 100.

Network 540 may include any suitable devices, media and/or protocol for interconnecting computer systems, such as wired or wireless Ethernet, for example. In various embodiments, network 540 may include local area networks (LANs), wide area networks (WANs), telecommunication networks, or other suitable types of networks. In some embodiments, computer system 550 may be similar to or identical in configuration to illustrated system 500, whereas in other embodiments, computer system 550 may be substantially differently configured. For example, computer system 550 may be a server system, a processor-based client system, a stateless "thin" client system, a mobile device, etc. In some embodiments, processor 100 may be configured to communicate with network 540 via network interface(s).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A processor, comprising:
   an instruction miss buffer comprising a plurality of miss entries, each of which is configured to store thread state information corresponding to a respective instruction cache miss, wherein the processor is configured to execute instructions for a plurality of threads;
   wherein the instruction miss buffer is configured to store, at a given point in time, two or more sets of thread state information in two or more of the plurality of miss entries;
   wherein the plurality of miss entries includes a dynamic portion having one or more dynamically allocable entries, wherein each of the one or more dynamically allocable entries is allocable to a given one of a group of two or more of the plurality of threads;
   wherein the plurality of miss entries includes a dedicated portion having at least one entry reserved, respectively, for use by each active thread of the plurality of threads; and
   wherein the instruction miss buffer is configured to:
      in response to information indicating that all of the plurality of miss entries of the dedicated portion are allocated to active threads of the plurality of threads, and that a particular thread is active and does not correspond to a dedicated miss entry of the plurality of entries, convert a particular entry of the one or more dynamically allocable entries into an entry dedicated for use by only the particular thread while the particular thread remains active.

2. The processor of claim 1, wherein the instruction miss buffer includes a plurality of semi-reserved entries, each of which is dedicated for use by different respective sub-groups of two or more of the plurality of threads.

3. The processor of claim 1, wherein the instruction miss buffer is configured to convert the particular entry into one of the one or more dynamically allocable entries in response to an indication that the particular thread is no longer active.

4. The processor of claim 1, wherein the two or more sets of thread state information correspond to two or more respective instruction cache misses for a same one of the plurality of threads; and
   wherein at least one of the two or more sets of thread state information includes a program counter address for the same one of the plurality of threads and is usable by the processor to cause a resumption of execution for the same one of the plurality of threads.

5. The processor of claim 1, wherein the two or more sets of thread state information correspond to two or more respective instruction cache misses for a same one of the plurality of threads; and
   wherein at least one of the two or more sets of thread state information includes a tag identifier value, wherein the tag identifier value is of a size smaller than a size of a program counter address for the same one of the plurality of threads.

6. The processor of claim 1, wherein the two or more sets of thread state information correspond to two or more respective instruction cache misses for a same one of the plurality of threads;
   wherein the processor includes an instruction cache;
   wherein each one of the two sets of thread state information includes a thread ID of the same one of the plurality threads; and
   wherein the processor is configured, in response to a miss request being serviced, to use the thread ID to locate and free one of the plurality of miss entries.

7. The processor of claim 6, wherein the processor is configured, in response to the miss request being serviced, to copy one or more instructions to the instruction cache.

8. A processor, comprising:
   one or more cores configured to execute a plurality of threads; and
   an instruction miss buffer comprising a plurality of miss entries configured to store sets of thread state information that correspond to ones of the plurality of threads and are associated with instruction cache misses for the plurality of threads;
   wherein the plurality of miss entries includes a dynamic portion having one or more dynamically allocable entries, wherein each of the one or more dynamically allocable entries is allocable by the processor to at least a subset of the plurality of threads;
   wherein the plurality of miss entries includes a dedicated portion having one or more entries reserved for individual ones of each active thread in the plurality of threads;
   wherein the instruction miss buffer is configured to:
      in response to information indicating that all of the plurality of miss entries of the dedicated portion are allocated to active threads of the plurality of threads, and that a particular thread is active and does not correspond to a dedicated miss entry of the plurality of entries, convert a particular entry of the one or more dynamically allocable entries into an entry dedicated for use by only the particular thread while the particular thread remains active.

9. The processor of claim 8, wherein each of the one or more dynamically allocable entries is allocable by the processor to a given one of the plurality of threads.

10. The processor of claim 8, wherein the processor is configured to allocate a given one of the one or more dynamically allocable entries in response to a miss request; and
wherein the processor is configured to free the given one of the dynamically allocable entries in response to the miss request being serviced.

11. The processor of claim 8, wherein for a first one of the plurality of miss entries that has been allocated for a miss request, and wherein upon one or more instructions associated with an instruction cache miss being copied to an instruction cache in response to the miss request, the processor is configured to free the first one of the plurality of miss entries.

12. The processor of claim 11, wherein in response to the processor freeing the first one of the plurality of miss entries, the processor is configured to use an arbitration scheme to determine which one of two or more threads having competing miss requests will be allowed to use the first one of the plurality of miss entries.

13. A method, comprising:
storing, by a processor, a first set of thread state information for a first thread in a particular the dedicated entry of a plurality of miss entries, wherein the first set of thread state information corresponds to a first instruction cache miss for the first thread, wherein the plurality of miss entries includes a plurality of dedicated miss entries reserved, respectively, for use by each active thread of the plurality of threads, and wherein the plurality of miss entries includes one or more dynamically allocable miss entries that are usable by any of the plurality of threads;
in response to subsequently received information indicating that a second thread of the plurality of threads is active and does not correspond to a dedicated miss entry of the plurality of entries, and that all of the plurality of dedicated miss entries are reserved to active threads of the plurality of active threads, converting a specific entry that is a next to be freed one of the one or more dynamically allocable miss entries into a dedicated miss entry; and
reserving the specific entry for exclusive use by the second thread while the second thread remains active, wherein the reserving disallows any other of the plurality of threads to use the specific entry.

14. The method of claim 13, further comprising the processor servicing a first miss request corresponding to the first instruction cache miss, including copying one or more instructions associated with the first instruction cache miss to an instruction cache.

15. The method of claim 13, further comprising releasing the specific entry, subsequent to the reserving, and allowing the specific entry to be used by any of the plurality of threads in response to an indication that the second thread has gone inactive again.

16. The method of claim 13, wherein, prior to the subsequently received information being received, the second thread became inactive.

17. the method of claim 16, further comprising, prior to the subsequently received information being received, and prior to the second thread becoming inactive, reserving a different entry of the plurality of miss entries for exclusive use by the second thread.

18. The method of claim 17, wherein the different entry is a different one of the one or more dynamically allocable entries.

* * * * *

UNITED STATES PATENT AND TRADEMARK OFFICE
CERTIFICATE OF CORRECTION

PATENT NO.        : 9,529,594 B2                                    Page 1 of 1
APPLICATION NO.   : 12/956409
DATED             : December 27, 2016
INVENTOR(S)       : Shah et al.

It is certified that error appears in the above-identified patent and that said Letters Patent is hereby corrected as shown below:

In the Specification

In Column 12, Line 60, delete "(non-reassignbly) and insert -- (non-reassignable) --, therefor.

In the Claims

In Column 18, Line 29, in Claim 17, delete "the method" and insert -- The method --, therefor.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*